Patented June 1, 1948

2,442,330

UNITED STATES PATENT OFFICE 2,442,330

METHODS OF VULCANIZING SATURATED LINEAR POLYMERS AND VULCANIZED PRODUCTS PRODUCED THEREBY

Calvin S. Fuller, Chatham, N. J., assignor to Bell Telephone Laboratories, Incorporated, New York, N. Y., a corporation of New York No Drawing. Application April 30, 1943, Serial No. 485,203

6 Claims. (Cl. 260—87)

This invention relates to relatively high molecular weight polymeric substances and to methods of producing them. More particularly it relates to the cross-linking or vulcanization of polymeric substances containing no substantial amount of non-benzenoid carbon-to-carbon unsaturation. This application is a continuation in part of the application of C. S. Fuller, Serial No. 401,952, filed July 11, 1941, now United States Patent 2,388,319, issued November 6, 1945.

Many instances can be found in the technical literature describing the polymerization of compounds containing olefinic unsaturation through double bond interaction under the influence of benzoyl peroxide. United States Patent 2,195,362, for instance, describes the cross-linking in this manner of polyesters containing large amounts of unsaturation and prepared from glycols and maleic acid. It has been generally accepted that the setting of long linear molecules by cross-linking of this type can be accomplished only through unsaturated carbon-to-carbon bonds.

The present invention is based upon the discovery that certain relatively high molecular weight essentially linear polymers containing hydrocarbon groups and certain "activating" groups can be cross-linked or vulcanized by the action of benzoyl peroxide and other compounds having a similar effect, even though the polymers contain no non-benzenoid unsaturation and no unsaturated substances of any kind are present in the reaction mixture. Such saturated polymers are capable of being cross-linked according to the present invention if they contain hydrogen atoms which are sufficiently loosely bound to carbon atoms of hydrocarbon groups and which are otherwise capable of being split off from the molecule.

Cross-linking appears to take place, when such compounds are heated with benzoyl peroxide, through the generation of free phenyl or benzoyl radicals upon the decomposition of the benzoyl peroxide, which radicals, due to their hydrogen deficiency, dislodge the loosely bound hydrogen atoms of the polymer molecules, permitting cross-linking to take place through the resulting free valence bonds.

The effect of the cross-linking of the present invention upon the physical properties of the polymer depends largely upon the initial physical properties of the polymer. If the original polymer at room temperatures in a plastic, amorphous substance or even a rubber-like substance, it may assume properties resembling vulcanized natural rubber upon cross-linking. If it is initially a thermoplastic, soluble, substantially amorphous substance which is a rigid glass at room temperatures, it will lose its thermoplasticity when sufficiently cross-linked and will become insoluble. It will also usually be more flexible at room temperatures. If the original polymer is a rigid, microcrystalline substance at room temperatures, which is reduced upon heating to a viscous liquid, the vulcanized polymer will retain its microcrystallinity but will ordinarily possess more or less rubber-like properties when heated until its crystallinity disappears. If the microcrystalline polymer possesses the property of cold drawing, it will usually retain this property after cross-linking.

The cross-linking process of the present invention is valuable as applied to the curing of the linear polyesters of high molecular weight as produced, for instance, by the methods described in United States Patents 2,071,250 and 2,249,950, although the invention is applicable to many other polymers as will be discussed below. The following specific examples will illustrate the manner in which the present invention may be practiced upon linear polyesters containing no unsaturation.

Example 1

2 grams of polyethylene succinate having an intrinsic viscosity of 0.52 (as measured with a chloroform solution containing 0.4 gram of polyester per 100 cubic centimeters of solution) were dissolved in hot methyl cellosolve acetate and 0.2 gram of benzoyl peroxide were added to the solution. Clear films of the solution were formed on metal and heated in an oven at 140° C. The liquid films gelled in ten minutes.

Example 2

100 grams of polyethylene-propylene succinate (prepared by reaction of 1 mol of succinic acid with 0.5 mol ethylene glycol and 0.5 mol propylene glycol) and 5 grams benzoyl peroxide were mixed thoroughly on a conventional rubber mill. A lump of the mix weighing 60 grams was placed in a six-inch, 50 mil rubber mold and the mold was heated to 135° C. for 5 minutes. The polyester underwent a vulcanization reaction and came out of the mold in the form of a flexible transparent sheet having none of the tackiness of the original ester and being no longer subject to flow under stress. Toluene exerts only a slight swelling action on the vulcanized sheet, which has the appearance of well-cured gum rubber.

*Example 3*

20 grams of polyethylene-propylene sebacate (prepared from 1 mol of sebacic acid with 0.2 mol ethylene glycol and 0.8 mol propylene glycol) was intimately mixed with 0.5 gram benzoyl peroxide by means of a spatula. The resulting mix on being heated in a two-inch mold gave a well-vulcanized rubbery disc.

The products of Examples 2 and 3 are excellent synthetic rubbers. The uncured polyesters, when mixed with suitable pigments, such as the red oxide of iron known as Mapico 297 or the calcium carbonate known as Kalvan, and then cured with benzoyl peroxide, gave vulcanized synthetic rubber products which possessed excellent tensile strength and reversibile elasticity. These synthetic rubbers are more particularly described and claimed in the copending application of C. S. Fuller, Serial No. 485,202, filed April 30, 1943.

Any other linear polyester containing a substantial number of ester groups which have an unsubstituted methylene group adjacent to their

portion may be vulcanized as set forth above. To be effectively vulcanized and to possess a desirable tensile strength, the polyesters should possess a linear chain length corresponding to an intrinsic viscosity of at least 0.3 (as measured in a chloroform solution containing 0.4 gram of polyester per 100 cubic centimeter of solution) and preferably of 0.5 or higher.

The cross-linking action described above may be obtained with many other types of polymers containing active hydrogen atoms. Linear polymers containing ester groups in the side chains, such as polyvinyl acetate or other polyvinyl alkylates, methyl acrylate or other alkyl acrylates and methyl methacrylate, butyl methacrylate or other alkyl alkacrylates may also be cross-linked as described above.

Moreover, linear polymers which contain

groups, other than as portions of ester groups, adjacent to a carbon atom having one or two hydrogens bonded thereto are suitable for the purposes of the present invention. Thus polyketones made up of

groups separated by polymethylene groups, or other linear polymers containing ketone groups in either the linear chain or in side chains, may be used.

Similarly, linear polyamides containing, in the linear chain, linkages of the structure

where R is a hydrocarbon radical, especially an alkyl or methyl radical, may also be cross-linked as described above, as may also polymers containing similar linkages in side chains. Polyamides containing no N— substituent do not appear to vulcanize, apparently because the primary amide group reacts with the vulcanizing agent. When the N— hydrogen is replaced by a methyl group or other suitable radical, the polyamide may become cross-linked, but the effect is not as pronounced as with other linear polymers, a much greater concentration of vulcanizing agent and a higher curing temperature being required.

In each case the vulcanization appears to take place through the dehydrogenation of loosely bound hydrogen atoms in hydrocarbon groups in the vicinity of the ester, ketone, substituted amide, or other activating groups. The presence of these activating groups decreases the bond energy of nearby carbon-to-hydrogen bonds, the effect decreasing as the carbon-to-hydrogen bond becomes further removed from the activating group. The bond energy for any particular carbon-to-hydrogen bond is lower, the smaller the number of additional hydrogen atoms attached to the carbon atoms. Thus it appears to be possible to activate the hydrogen atoms of $CH_2$ and CH groups in polymers sufficiently to cause cross-linking when heated with benzoyl peroxide, but it does not appear possible to activate the hydrogen atoms of methyl groups to this extent.

In any case, vulcanization by means of free radicals can be made to take place, if the average polymer molecule contains a substantial number of hydrogen atoms bonded to carbon atoms with a bond energy less than roughly about 60 kilogram calories per mol (as compared to about 80 kilogram calories per mol for carbon-to-hydrogen bonds in a hydrocarbon molecule), and if the conditions are such that the activation energy of the reaction is less than about 20 kilogram calories per mol.

Hydrogen atoms having the required energy relationship can be found in polymer molecules other than those containing the activating groups referred to above. Thus the acetal groups,

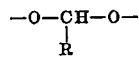

where R is hydrogen or an alkyl radical, contain a hydrogen atom which is sufficiently active to cause the cross-linking of polymers which contain these groups, when the polymers are exposed to the action of free radical generating substances. Polyacetals, containing the acetal linkages in the linear chain, may be cross-linked in this manner. Similarly linear polymers containing the acetal group in side chains may be cross-linked, such as polyvinyl formal, polyvinyl butyral or other polyvinyl acetals.

It is desirable that each of the linear polymers treated according to the present invention have a certain minimum molecular length in order that it may possess the desired physical strength and in order that it may readily be cross-linked. In general these polymers will have the desired physical properties if they have an average molecular weight corresponding to an average linear chain length of at least about 500 atoms. For some of the less active polymers it may be desirable to have a chain length of at least about 1,000 atoms.

Theoretically, if the polymer molecules could be caused to cross-link at every active hydrogen, the presence of only a very small number of active hydrogens would be required per molecule to insure the creation of an insoluble, infusible mass by treatment as described above. However, in order to induce vulcanization within a reasonable time and without an excessive amount of curing agent, it is necessary that a considerably larger number of active hydrogens be present in each molecule. Although curing may take place effectively when the average number of active hydrogens per molecule is equal to one such hydrogen per 20 atoms in the linear chain, more effective curing takes place when the number of active hydrogens is greater than one such hydrogen per 12 atoms in the linear chain, and the curing is most effective when the number of active hydrogens is not less than about one such hydrogen per 7 atoms in the linear chain.

Benzoyl peroxide has been given above as an example of a free radical generating substance capable of inducing the vulcanization with which the present invention is concerned. This substance is the most effective one for the purposes of the present invention which has yet been found. Certain other acyl peroxides, such as lauryl peroxide, are also effective although less active. Certain other organic peroxides, such as certain of the ether peroxides, the ketone peroxides, the olefine peroxides, the unsaturated ketone peroxides, the terpene peroxides (particularly ascaridol), the aldehyde peroxides and the hydrocarbon peroxides are often sufficiently effective to render them usable for the purpose of the present invention.

Other free radical generating substances, such as phenyl azide or certain other azides exert a less effective cross-linking action which will, nevertheless, accomplish the purpose of the present invention.

The free radical generating substance may be incorporated into the linear polymer to be cured in any suitable manner. If the polymer is fluid or plastic at ordinary temperatures, or can be reduced to a fluid or plastic state at temperatures at which no substantial curing takes place, the curing agent can be milled directly into the polymer. If, however, the polymer cannot be rendered plastic below the curing temperature, it is necessary to add the curing agent to a solution of the polymer and then evaporate the solution before heating to a curing temperature.

The proportion of free radical generating substance employed will depend upon the activity of the polymer and upon the free radical generating substance chosen. Under ordinary circumstances amounts of the order of several per cent should be sufficient but in some instances it may be necessary to use up to about 30 per cent of the curing agent. It is ordinarily desirable to use the smallest amount of curing agent which is consistent with good vulcanization.

The temperature required for curing must be such that the free radical generating substances decompose at a rate which is sufficient to give a practical rate of curing. With benzoyl peroxide a slight curing action may often be observed at temperatures as low as 50° C., but it is usually necessary to heat to a temperature above 105° C. to secure a practical rate of cure. In most cases about 125° C. is a desirable cross-linking temperature when this substance is used.

The following specific examples will illustrate the manner in which the present invention may be carried out with polymers other than the polyesters:

*Example 4*

60 grams of "Butvar 25-95" (polyvinyl butyral, 95 per cent hydrolyzed) and 3 grams of benzoyl peroxide were dissolved on a tumbling machine in one pint of chloroform. The chloroform solution was evaporated on the rolls until no odor of chloroform could be detected. The resulting product had about the appearance and consistency of crepe rubber. A section of sheet was heated in a 3.5 inch mold for 5 minutes at 130° C. The molded sheet was somewhat puckered presumably due to the evolution of gas from the residual chloroform but it was well vulcanized into a permanent shape which did not change on being heated to 150° C. for 15 hours. The product was not rubbery but had about the same degree of hardness as papier-mâché.

*Example 5*

Polymerized n-butyl methacrylate was dissolved in chloroform with 5 per cent of its own weight of benzoyl peroxide. The solution was evaporated on a sheet of glass to form a film and the latter was heated in an oven at 125° C. for 20 minutes. The butyl methacrylate underwent gelation and was no longer soluble in chloroform.

*Example 6*

10 grams ethyl cellulose and 0.5 gram of benzoyl peroxide were dissolved in chloroform and a film was made on a glass slide by evaporation of the solvent. When the slide was heated to 130° C. for 5 minutes the ethyl cellulose gelled, becoming insoluble in chloroform.

*Example 7*

A sample of the polyamide obtained by reacting N,N'-dimethyl decamethylene diamine with sebacic acid was melted on a hot plate (melting point 62° C.) and a little finely divided benzoyl peroxide was sprinkled over it. Heating was continued at about 130° C. and the sample was stirred vigorously. After two or three minutes the sample set to a dry rubbery gel.

For the purposes of the present invention it is immaterial what is the chemical constitution or molecular structure of the portions of the linear polymer molecules, other than the active groups referred to above, so long as the molecules contain no groups which would interfere with the cross-linking action either through reaction with the curing agent, steric hindrance or other factors, although obviously the constitution of the remainder of the molecule will have an important effect on the physical properties of the resulting substance.

In most common linear polymers, the portion of the molecule other than the active groups consists of saturated aliphatic hydrocarbon groups. It should be noted, however, that a slight amount of unsaturation is not detrimental to the cross-linking action. The presence of other types of structures in the remainder of the molecules, such as aromatic rings, sulphur or oxygen linkages and polar substituents is ordinarily not detrimental so long as they are not in a position such as to interfere sterically with cross-linking.

Although the invention has been described with reference to certain specific embodiments, certain modifications and equivalents will be apparent to one skilled in the art and are intended to be included within the scope of the invention which is to be limited only by the reasonable scope of the appended claims.

What is claimed is:

1. An infusible, insoluble polymer produced from a linear polyvinyl ester having an average molecular chain length of at least 500 atoms by heating a body comprising a homogeneous portion consisting of an intimate mixture of said linear polyvinyl ester and at least 5 per cent of an organic peroxide until the polyvinyl ester becomes infusible and insoluble.

2. An infusible, insoluble polymer as defined in claim 1 wherein the average molecular chain length of the polyvinyl ester is at least 1000 atoms and the organic peroxide is an acyl peroxide.

3. An infusible, insoluble polymer as defined in claim 1 wherein the organic peroxide is benzoyl peroxide.

4. The method of vulcanizing a fusible linear polyvinyl ester which has an average molecular chain length of at least 500 atoms which method comprises forming a mixture having homogeneous portions which consist of said polyvinyl ester intimately mixed with at least 5 per cent of an organic peroxide and heating said mixture until the polyvinyl ester has been vulcanized to an infusible, insoluble state.

5. The method as described in claim 4 wherein the polyvinyl ester has an average molecular chain length of at least 1000 atoms and wherein the organic peroxide is benzoyl peroxide.

6. The method of vulcanizing fusible linear polyvinyl acetate which method comprises forming a mixture which consists of said polyvinyl acetate intimately mixed with at least 5 per cent of organic peroxide and heating said mixture until the polyvinyl acetate has been vulcanized to an infusible, insoluble state.

CALVIN S. FULLER.

REFERENCES CITED

The following references are of record in the file of this patent:

UNITED STATES PATENTS

| Number | Name | Date |
| --- | --- | --- |
| 2,045,651 | Hill | June 30, 1936 |
| 2,120,006 | Strain | June 7, 1938 |
| 2,224,663 | Berg | Dec. 10, 1940 |
| 2,249,498 | Schulze | July 15, 1941 |
| 2,250,485 | Kautter | July 29, 1941 |
| 2,274,831 | Hill | Mar. 3, 1942 |
| 2,321,048 | Schildknecht | June 8, 1943 |
| 2,321,759 | Macht | June 15, 1943 |
| 2,332,461 | Muskat | Oct. 19, 1943 |
| 2,388,319 | Fuller | Nov. 6, 1945 |

FOREIGN PATENTS

| Number | Country | Date |
| --- | --- | --- |
| 698,614 | Germany | Nov. 14, 1940 |

OTHER REFERENCES

Blaikie et al., Ind. & Eng. Chem., vol. 28, pages 1155–9, Oct. 1936.

Powers Synthetic Resins and Rubbers, pages 117–118 and 128, John Wiley & Sons, N. Y. (1943).